Aug. 20, 1957 — O. J. BORROWDALE — 2,803,445
FREELY SWINGING ROTATING ANTIBRIDGING
DEVICE FOR BULK MATERIAL
Filed Sept. 11, 1952 — 3 Sheets-Sheet 1
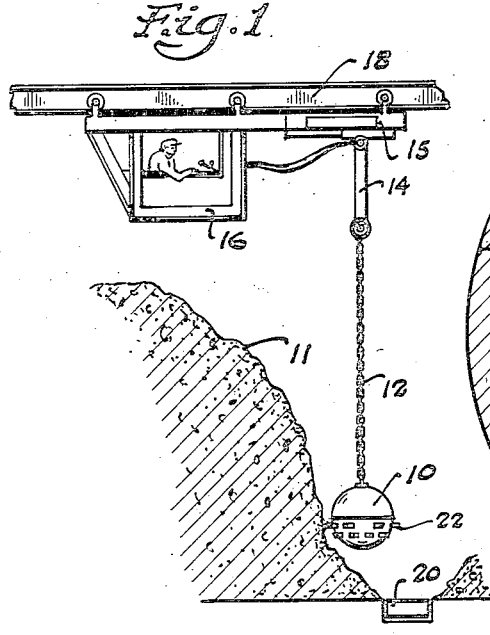
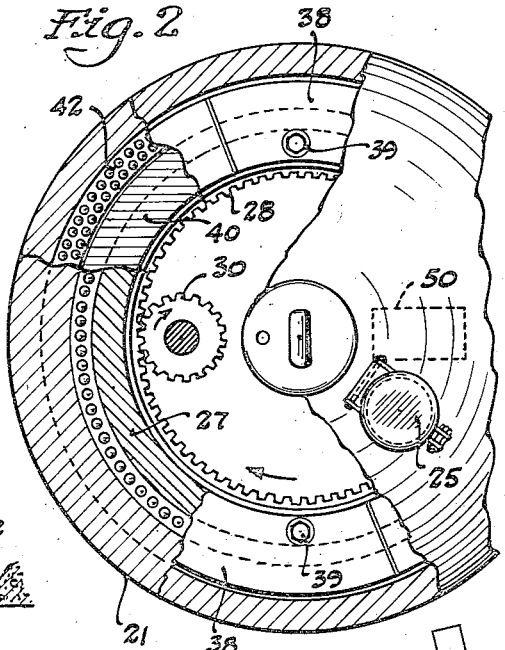
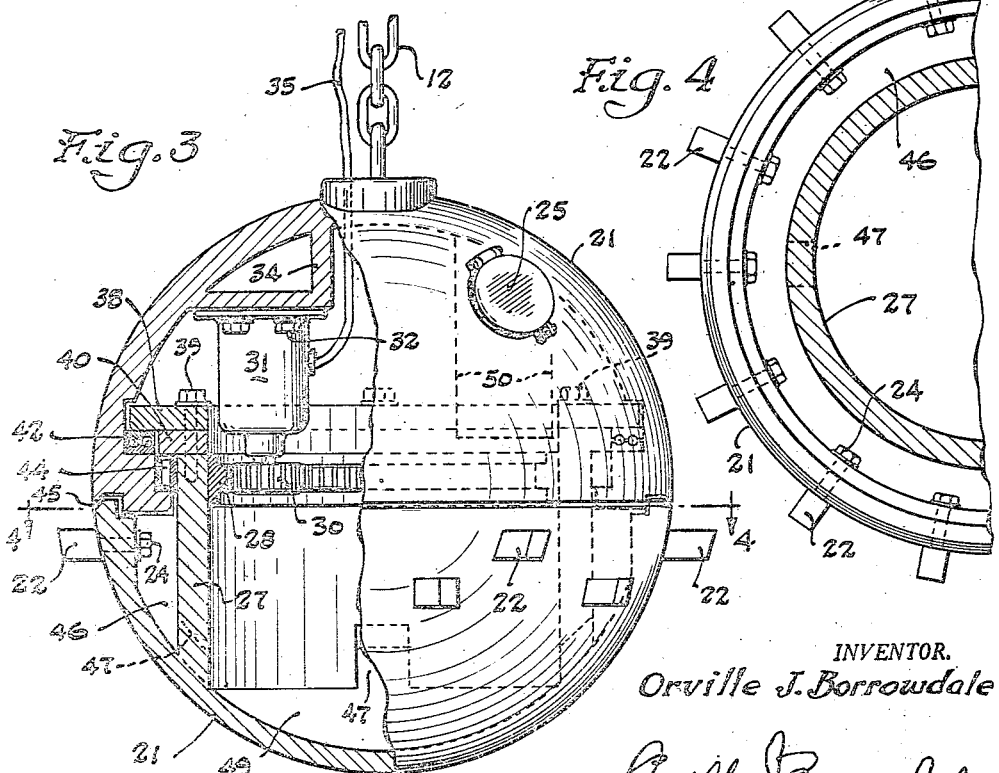
INVENTOR.
Orville J. Borrowdale Aug. 20, 1957  O. J. BORROWDALE  2,803,445
FREELY SWINGING ROTATING ANTIBRIDGING
DEVICE FOR BULK MATERIAL
Filed Sept. 11, 1952  3 Sheets-Sheet 2

INVENTOR.
Orville J. Borrowdale

Aug. 20, 1957  O. J. BORROWDALE  2,803,445
FREELY SWINGING ROTATING ANTIBRIDGING
DEVICE FOR BULK MATERIAL
Filed Sept. 11, 1952  3 Sheets-Sheet 3

INVENTOR.
Orville J. Borrowdale

United States Patent Office 2,803,445
Patented Aug. 20, 1957

2,803,445

FREELY SWINGING ROTATING ANTIBRIDGING DEVICE FOR BULK MATERIAL

Orville J. Borrowdale, Chicago, Ill.

Application September 11, 1952, Serial No. 309,092

3 Claims. (Cl. 262—13)

This invention relates to apparatus for destroying or preventing bridging action in bulk material, such as iron ore, sand, stone, coal, gypsum, limestone, phosphate ore, etc. The invention is particularly applicable for use in breaking down the bridging action of bulk material wherein an endless conveyor belt is arranged to travel below or adjacent to the bulk material which is loaded onto the conveyor for transfer to another location. The invention may be used in connection with the loading or unloading of cargo vessels, barges, cars and trucks; the transferring of material from one elevation to another; the conveying of material from mines; and the feeding of material to a restricted discharge opening.

In the loading of bulk material onto conveyors, for example, certain materials tend to cake and bridge instead of freely flowing as the body of material is undermined. In such cases a bridge is formed so that no more material flows to the conveyor. In materials such as iron ore this bridging action is serious and presents difficulties in breaking down the bridging action and slows down the loading, causing the use of expensive hand operations.

An object of the present invention is to provide an antibridging device which will effectively and efficiently break down the bridging action of bulk material so that it will flow freely onto a conveyor or into a discharge opening or will fill voids left in a body of the material.

Another object of the invention is to provide an antibridging device which may be readily delivered to a selected location and which is adapted to be applied to various areas of a body of bulk material to destroy or prevent bridging action and to keep the material flowing.

Other objects of the invention will be understood from the following description when read in connection with the accompanying drawings which illustrate diagrammatically the construction of the apparatus.

Fig. 1 is a sketch showing generally the manner in which the device of the present application may be used in connection with equipment for manipulating the same.

Fig. 2 is a top view partly in section of the antibridging device.

Fig. 3 is a side view partly in section of the same antibridging device.

Fig. 4 is a fragmentary view taken along the line 4—4 of Fig. 3.

Figure 5:
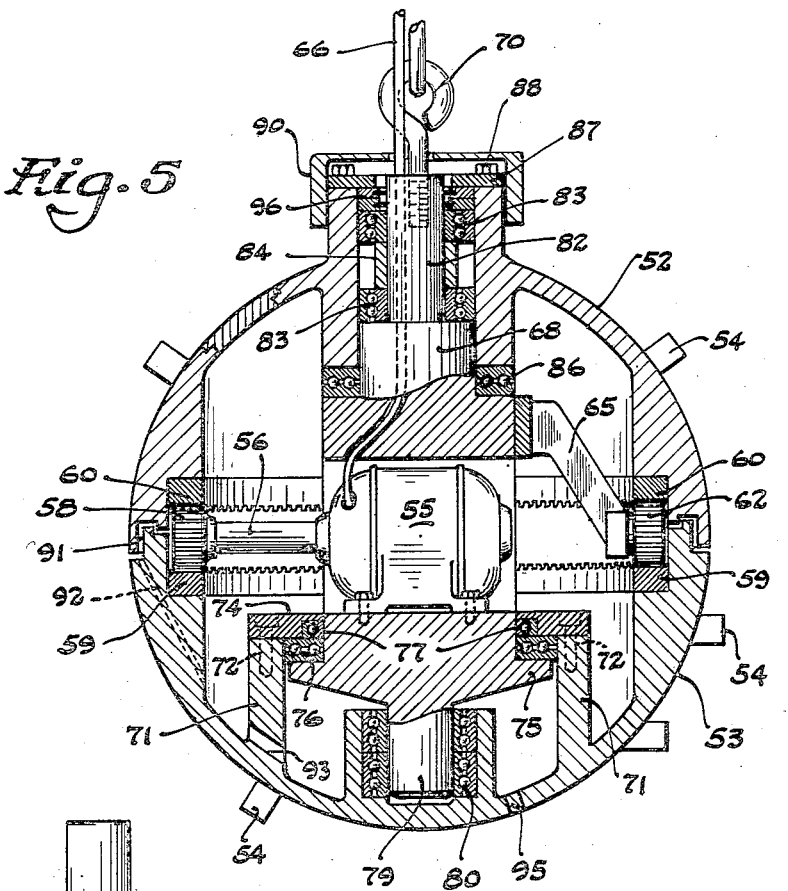
Fig. 5 is a vertical, sectional view through the center of another modification of the device of the present invention.

Referring to Fig. 1, the device of the present invention is represented generally by the numeral 10 adjacent a body of bulk material 11. The antibridging device 10 is shown as suspended by a chain 12 from a pulley arrangement 14 for manipulating the device. The pulley 14 is operated by power equipment 15 which is controlled by an operator in the control car 16. The control car and power device are suspended from and movable on a trolley 18. As shown in Fig. 1 the antibridging device 10 is operating on the edge of the body of bulk material 11 to cause it to flow onto a conveyor 20. It is to be understood that Fig. 1 is for purposes of illustration only as various modifications in the arrangement are contemplated. For example, the trolley 18 is shown at right angles to the conveyor 20 whereas the trolley might advantageously be arranged to run parallel to the conveyor. Also, various types of operating equipment other than the car and trolley might be used, such as a crane, a motor-operated vehicle, or other suitable manipulating means.

The antibridging device 10, as shown in more detail in Figs. 2–4, comprises a spherical shell 21 which is composed of two hemispheres forming the top and bottom sections. As shown in Figs. 1–4 the bottom section is provided with a plurality of spaced spurs or lugs 22 which are fastened to the shell by bolts 24, or other suitable means, and project outwardly a considerable distance from the outer periphery of the shell. These spurs are arranged in a suitable manner to provide maximum disintegrating action on the bulk material with which they come in contact by a revolving action of the lower half of the sphere. The shell is also provided in the surface of the upper half thereof with a manhole which is covered by a hinged door 25 and which may be opened to provide access to the interior of the sphere.

The cylindrical support 27 is rigidly secured at the lower end to the lower portion of the interior of the bottom half of the shell 21. The cylinder 27 extends upwardly approximately midway of the shell and is flat at its upper end for supporting the upper half of the shell as described hereinafter. An internal ring gear 28 is rigidly secured to the inside of the cylinder 27 near the top thereof. A pinion gear 30 cooperates with the ring gear 28 to cause the bottom half of the shell to rotate. The pinion gear 30 is driven by a motor 31 suspended by bolts 32 from a frame 34 attached to the upper inside portion of the top half of the shell. The motor is connected to a source of electrical energy by an armored electric cable 35 extending through the top of the shell. The position of the motor in the shell may be varied in relation to the axis and rotation of the bottom half of the shell.

The two halves of the shell are fastened together by a locking ring 38 and locking bolts 39 which pass through the locking ring and are threaded into the top of the cylinder 27. A spacing ring or washer 40 separates the locking ring 38 from the cylinder 27, providing space at its outer perimeter for thrust bearings 42 which support the major portion of the weight of the lower half of the sphere. In order to provide for weight of the lower half of the sphere and to alleviate friction when the shell is tipped to one side, roller bearings 44 are provided near the outer top surface of the cylinder 27.

The two halves of the sphere are spaced a slight distance apart at their juncture providing a clearance 45 to avoid friction. Any dust, moisture, or other material passing through the clearance into the interior of the shell will collect in the space 46. Holes 47 are provided in the cylinder so that such material can pass therethrough into the space 49 from whence it may be voided from the sphere by suitable discharge openings not shown in the bottom of the sphere.

In order to balance the weight of the sphere, particularly to counterbalance the weight of the motor 31, a weight 50 of suitable size may be placed at a suitable position in the upper portion of the shell opposite the motor.

Figure 6:
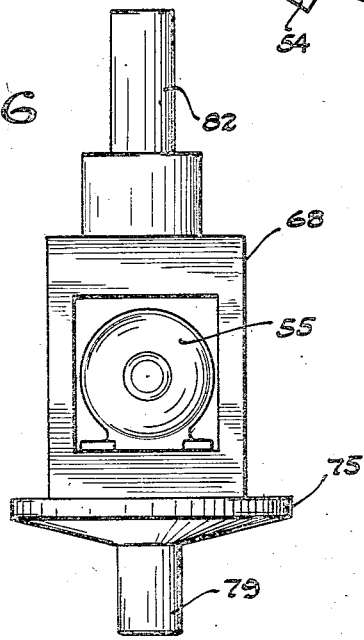
Fig. 6 is a skeleton view of the supporting shaft of the device of Fig. 5.

In the modification shown in Figs. 5 and 6, the top half 52 of the sphere is arranged to rotate as well as the bottom half 53. Both halves are provided with lugs 54. The motor 55 is in a horizontal position with the drive shaft extending horizontally to the left and terminating in a pinion gear 58 which cooperates with ring gears 59 and 60. At the opposite side of the sphere is an idling pinion gear 62 which cooperates with the ring gears 59 and 60 and which is supported by a bracket 65. The motor is connected with a source of power through the cable 66. It will be observed that when the ring gears are driven by the motor the two halves of the sphere will revolve in opposite directions.

The motor 55 is supported by a shaft 68, shown in Fig. 6, which in turn is suspended by a chain 70. The lower half of the sphere is supported by a cylinder 71, the upper edges of which are secured by bolts 72 to a thrust ring 74 which rests upon the shoulders 75 of the shaft 68. The ring 74 is supported on lower thrust bearings 76 and thrust ring 77. The lower stem 79 of the shaft 68 is supported by radial bearings 80 as is also the upper stem 82 by the radial bearings 83 which are separated by a bearing spacer 84. The upper half of the shell rides upon upper thrust bearings 86 and is also supported on the shaft 68 by a ring 87 and bolts 88. The neck at the top of the sphere is covered by a protective cap 90. Any material entering through the crevices 91 between the juncture of the hemispheres will pass through channels 92 and 93 to the bottom of the shell and be released through the hole 95 which may be closed with a plug if desired. The top of the sphere is preferably provided with a dust seal 96.

Figure 7:
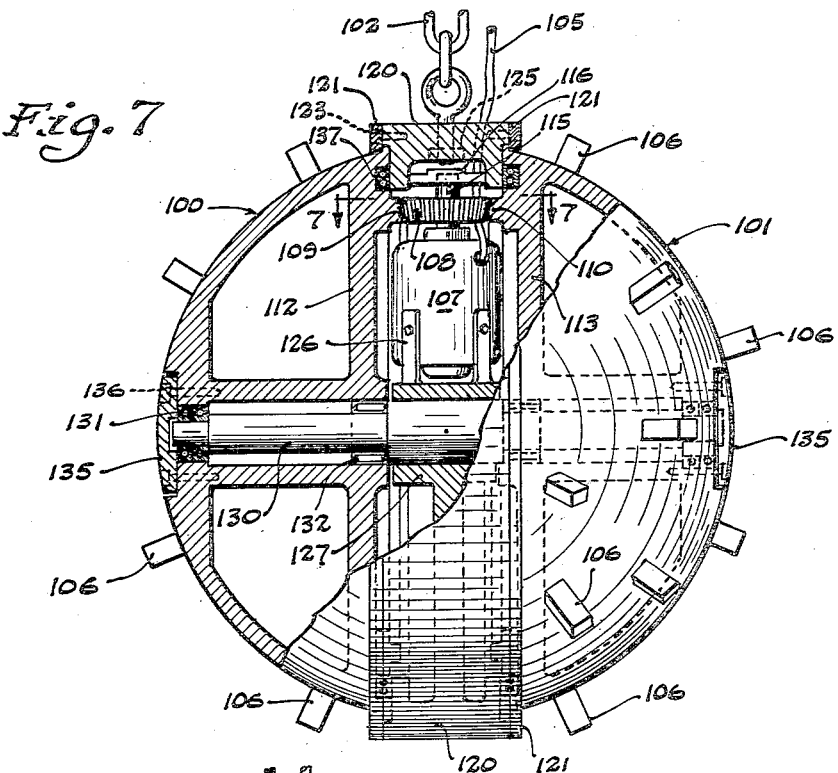
Fig. 7 is a side view partly in section of still another modification of the device of the present invention.
Figure 8:
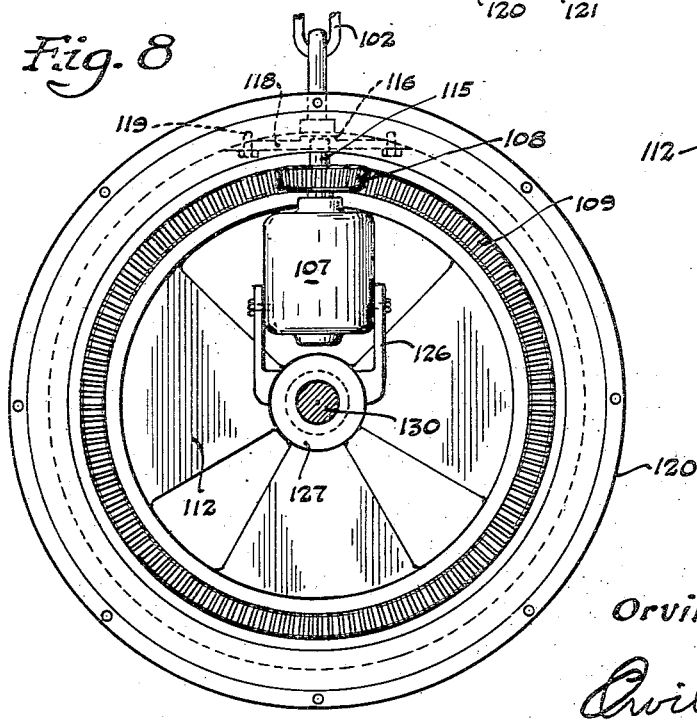
Fig. 8 is a right side view along the center of the device of Fig. 7 with the front half thereof removed.
Figure 9:
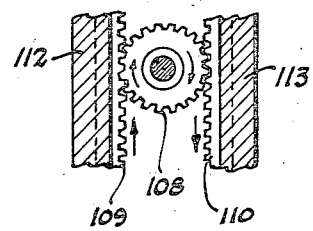
Fig. 9 is a view taken along the line 7—7 of Fig. 7.

In the modification of the invention shown in Figs. 7–9 the sphere is divided in a vertical instead of a horizontal direction forming left and right hemispheres 100 and 101, respectively, both of which are rotatable. The sphere is suspended from chain 102. A cable 105 supplies electrical power to the motor. The outside surface of the sphere is provided with lugs 106. The motor 107 is connected with a pinion gear 108 which cooperates with ring gears 109 and 110 to rotate the left and right hemispheres in clockwise and counterclockwise directions, respectively. The ring gears 109 and 110 are secured by a plurality of brackets 112 and 113 to the interior of the shell. The pinion gear 108 is secured to a drive shaft 115 which extends from the motor 106 to a bearing 116 which is secured by a bracket 118 and bolts 119 to a main housing 120. The two halves of the sphere are slidably held to the housing by a locking ring 121 which is secured to the housing 120 by locking screws 123. The chain 102 is secured as by a burr 125 to the housing for supporting the shell. The motor 107 is rigidly secured by brackets 126 to a bearing 127 which cooperates with an axle or shaft 130. The two halves of the sphere are supported for rotation on the shaft 130 by ball bearings 131 and roller bearings 132. Caps 135 secured to the surface of the sphere by bolts 136 are provided to permit access to ends of shaft 130 and bearings 131. Thrust bearings 137 are provided between the halves of the sphere and housing 120.

The means for lubrication of the bearings shown in the several figures is not given but any well-known or preferred type of lubrication may be used.

The lugs on the outside of the sphere may be placed either parallel to the equator of the sphere, or on center lines radiating from the center point in the sphere, or in any other desired arrangement to produce maximum disintegrating action on the bulk material.

While the antibridging device of the present invention has been shown in the drawings and described as a sphere, it is to be understood that various shapes and forms may be used as, for example, an octohedron or a cylinder. Also, instead of the device being circular in form, it may be oval or any other desired shape.

The antibridging device may be of any desired size and weight depending upon the type of material upon which it acts. In handling iron ore it is desirable that the sphere be several feet in diameter and weigh several tons.

In practicing the present invention the sphere is suspended from a manipulating machine, such as a crane, which is adapted to raise or lower the antibridging device and to swing the device at various angles. In this way the device is directed in contact with the bulk material whereby the lugs disintegrate the caked or bridged material so that it will flow. Also, the weight of the device as it is swung against the bulk material will destroy the bridging action and break down the material into particles which are further disintegrated by the lugs. The rounded surfaces of the device permit it to bounce around and contact the corners and uneven surfaces of the bulk material.

Obviously, many modifications and variations of the invention as hereinbefore set forth may be made without departing from the spirit and scope thereof and, therefore, only such limitations should be imposed as are indicated in the appended claims.

I claim:

1. A device for disintegrating bulk solid material, which comprises a hollow body having at least two oppositely rotatable surfaces, flexible means for supporting said body for free swingable movement, lugs on the surfaces of said body, means for rotating said surfaces in opposite directions comprising a prime mover carried in said hollow body, and means for swinging said body to contact the bulk material.

2. An antibridging device, comprising a hollow body of generally spherical shape, said body comprising relatively movable hemispherical surfaces, lugs carried on at least one of said surfaces, and means including a prime mover, gears, and bearings carried in said hollow body to move said hemispherical surfaces in opposite directions, flexible means supporting said body for free swingable movement, and means for swinging said body.

3. A device to alleviate bridging in bulk material, comprising a hollow body of generally spherical shape, said body being divided into two substantially hemispherical shells, means carried in the interior of said body within said shells for positively rotating one of said substantially hemispherical shells only, and lugs carried on the surface of the rotated substantially hemispherical shell, flexible means for suspending said body for free swingable movement, and means for swinging said body.

References Cited in the file of this patent

UNITED STATES PATENTS

| 1,979,530 | Clark | Nov. 6, 1934 |
| 2,612,361 | Hagenbook | Sept. 30, 1952 |
| 2,677,536 | Gleeson | May 4, 1954 |

FOREIGN PATENTS

| 497,236 | Belgium | Nov. 16, 1950 |

OTHER REFERENCES

Bureau of Mines Information Circular, I. C. 7472, Aug. 1948, "A Skull Breaker in a Limestone Quarry," by McHenry Mosier.